United States Patent
Fujii

(10) Patent No.: US 11,733,799 B2
(45) Date of Patent: Aug. 22, 2023

(54) SENSING METHOD, TOUCH PANEL DRIVING DEVICE, AND TOUCH PANEL DEVICE

(71) Applicant: Futaba Corporation, Mobara (JP)

(72) Inventor: Masaki Fujii, Mobara (JP)

(73) Assignee: FUTABA CORPORATION, Mobara (JP)

( * ) Notice: Subject to any disclaimer, the term of this patent is extended or adjusted under 35 U.S.C. 154(b) by 0 days.

(21) Appl. No.: 17/839,894

(22) Filed: Jun. 14, 2022

(65) Prior Publication Data

US 2022/0404942 A1 Dec. 22, 2022

(30) Foreign Application Priority Data

Jun. 18, 2021 (JP) ............................... 2021-101803

(51) Int. Cl.
*G06F 3/041* (2006.01)
*G06F 3/044* (2006.01)

(52) U.S. Cl.
CPC ...... *G06F 3/04166* (2019.05); *G06F 3/04164* (2019.05)

(58) Field of Classification Search
None
See application file for complete search history.

(56) References Cited

U.S. PATENT DOCUMENTS

| | | | |
|---|---|---|---|
| 11,301,086 B2 | 4/2022 | Muguruma et al. | |
| 2014/0267085 A1* | 9/2014 | Li | G06F 3/041 345/173 |
| 2017/0097722 A1 | 4/2017 | Ogawa et al. | |
| 2019/0243483 A1* | 8/2019 | Sugimoto | G06F 3/044 |
| 2020/0004400 A1* | 1/2020 | Muguruma | G06F 3/04182 |

FOREIGN PATENT DOCUMENTS

| | | |
|---|---|---|
| JP | 2016-009441 A | 1/2016 |
| JP | 2020-004180 A | 1/2020 |
| KR | 1020160091642 A | 8/2016 |
| TW | 202014869 A | 4/2020 |

OTHER PUBLICATIONS

Taiwan Office Action cited in Taiwan Patent Appln. No. 111122486 dated Feb. 15, 2023.
Korean OA dated Apr. 18, 2023 cited in counterpart Korean Patent Appln. No. 10-2022-0073849.
Japanese Office Action issued for counterpart Japanese Patent Application No. 2021-101803 dated May 2, 2022.

* cited by examiner

*Primary Examiner* — Krishna P Neupane
(74) *Attorney, Agent, or Firm* — Bacon & Thomas, PLLC

(57) ABSTRACT

There is provided a sensing method of a touch panel driving device configured to perform scanning of sequentially selecting a pair of adjacent transmission signal lines and a pair of adjacent reception signal lines on a touch panel and select between a first mode and a second mode having higher sensitivity than the first mode as reception signal sensitivity of a pair of reception signal lines, comprising: a first sequence of performing the scanning in setting of the second mode to select the first mode or the second mode; and a second sequence of performing the scanning in the setting state of the mode selected in the first sequence to perform touch detection and generating information indicating a touched position.

3 Claims, 9 Drawing Sheets

FIG.7

A PATTERN

| 128 | 128 | 128 | 128 |
|---|---|---|---|
| 128 | + | − | 128 |
| 128 | − | + | 128 |
| 128 | 128 | 128 | 128 |

B PATTERN

| 128 | 128 | 128 | 128 |
|---|---|---|---|
| 128 | + | 128 | − |
| 128 | − | 128 | + |
| 128 | 128 | 128 | 128 |

C PATTERN

| 128 | 128 | 128 | 128 |
|---|---|---|---|
| 128 | + | − | 128 |
| 128 | 128 | 128 | 128 |
| 128 | − | + | 128 |

D PATTERN

| 128 | 128 | 128 | 128 |
|---|---|---|---|
| 128 | + | 128 | − |
| 128 | 128 | 128 | 128 |
| 128 | − | 128 | + |

SENSING METHOD, TOUCH PANEL DRIVING DEVICE, AND TOUCH PANEL DEVICE

TECHNICAL FIELD

The present disclosure relates to a touch panel sensing method, a touch panel driving device for driving a touch panel, and a touch panel device including a touch panel and a driving device thereof.

BACKGROUND

Various techniques related to a touch panel are known. Japanese Laid-open Patent Publication No. 2014-219961 discloses a sensing technique for improving a resolution by detecting a touch operation position by sensing two sets (a pair of transmission signal lines and a pair of reception signal lines) of signal lines (electrodes) simultaneously.

SUMMARY

A touch panel is generally designed to detect that a finger directly contacts a panel surface. Therefore, when the touch panel is operated with a glove on a hand, touch sensitivity deteriorates due to a thickness or material of the glove compared to a bare finger touch, which makes it difficult to perform a desired operation on the touch panel.

In order to operate the touch panel by a hand in a glove, it is necessary to increase the sensitivity of the touch panel. By changing the sensitivity setting, a touch signal activated by a hand in a glove can be amplified and detected and, thus, the touch operation can be performed.

On the other hand, if the sensitivity setting is changed, the touch sensitivity becomes excessively high compared to a bare finger touch, so that a touch signal may be out of the range. Accordingly, an accurate touch signal may not be detected, which causes a decrease in accuracy in calculating coordinates of a touch position.

As such, if there is a large difference in a touch signal strength depending on an object such as a finger and a glove, it is difficult to deal with all objects with one sensitivity setting.

There are actually various products having a touch panel and they are used for various purposes. Further, a touch panel is operated in various environments. Generally, a user desires to operate a touch panel with a finger, and also desires to operate the touch panel with a hand in a glove in some situations. For example, in a general sensitivity setting, in a work site where a user wears a glove and performs a task, it is extremely troublesome to take off the glove whenever a user wearing the glove operates the touch panel. On the contrary, in a setting in which the sensitivity is increased, it is not possible to accurately respond to the finger touch.

Further, it is inconvenient for a person who desires to perform a touch operation to switch the sensitivity setting every time.

Therefore, the present disclosure suggests a technique capable of appropriately performing a touch operation both when a touch panel is directly touched with a bare finger (hereinafter, referred to as "finger touch") and when a touch panel is touched with a hand in a glove (hereinafter, referred to as "glove touch").

A sensing method according to the present disclosure is a sensing method of a touch panel driving device configured to perform scanning of sequentially selecting a pair of adjacent transmission signal lines and a pair of adjacent reception signal lines on a touch panel and select between a first mode and a second mode having higher sensitivity than the first mode as reception signal sensitivity of a pair of reception signal lines, comprising: a first sequence of performing the scanning in setting of the second mode to select the first mode or the second mode; and a second sequence of performing the scanning in the setting state of the mode selected in the first sequence to perform touch detection and generating information indicating a touched position.

That is, the mode selection for the sensitivity setting is performed by scanning with the reception sensitivity set to high sensitivity. After that, in the state of the selected mode, an actual touch position is sensed.

A touch panel driving device and a touch panel device according to the present disclosure are devices that execute the sensing method described above, comprising: a reception circuit configured to select between a first mode and a second mode having higher sensitivity than the first mode as a reception signal sensitivity of the pair of reception signal lines; a mode controller configured to performs a scanning in the setting of the second mode to select the first mode or the second mode; and a detection calculator configured to generate information indicating a touched position during the scanning performed in the setting state of the mode selected by the mode controller.

BRIEF DESCRIPTION OF THE DRAWINGS

The objects and features of the present disclosure will become apparent from the following description of embodiments, given in conjunction with the accompanying drawings, in which:

FIG. 7 is a diagram for explaining detection patterns of a block in the embodiment;

DETAILED DESCRIPTION

Hereinafter, embodiments of the present disclosure will be described in the following order.

<1. Configuration of a touch panel device>
<2. Processing of a first embodiment>
<3. Processing of a second embodiment>
<4. Effects of embodiments and Modifications>

1. Configuration of a Touch Panel Device

Figure 1:
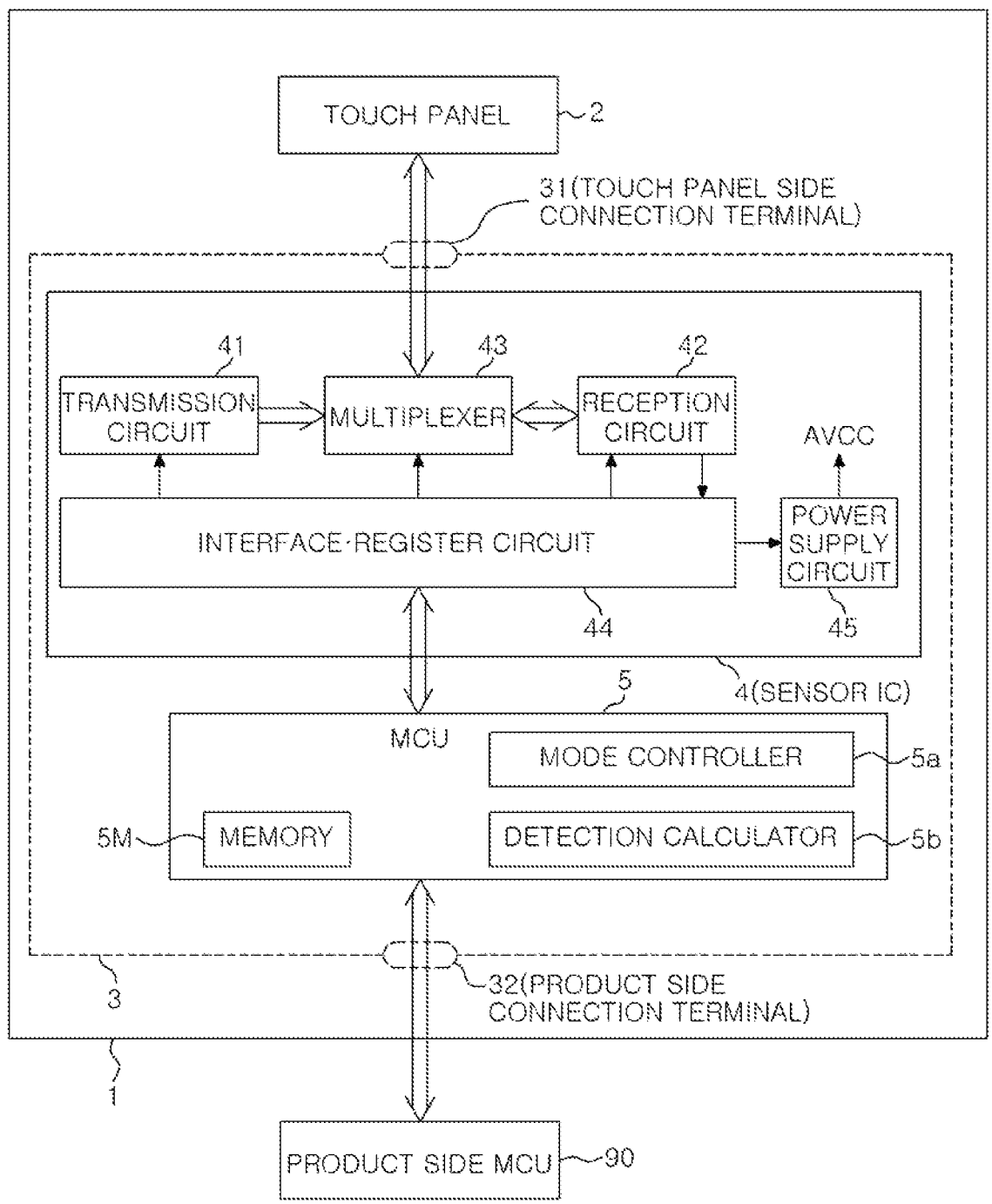
FIG. 1 is a block diagram of a configuration of a touch panel and a touch panel driving device according to an embodiment of the present disclosure.

FIG. 1 shows a configuration example of a touch panel device 1 according to an embodiment.

The touch panel device 1 is mounted as a user interface device in various devices. Here, various devices may be, e.g., electronic devices, communication devices, information processing devices, manufacturing equipments, machine tools, vehicles, aircrafts, building equipments, and other equipments in various fields. The touch panel device 1 is adopted as an operation input device used for a user's operation input in various equipment products.

FIG. 1 shows the touch panel device 1 and a product side micro control unit (MCU) 90. The product side MCU 90 indicates a controller in a device to which the touch panel device 1 is mounted. The touch panel device 1 provides information on a user's touch panel operation to the product side MCU 90.

The touch panel device 1 includes a touch panel 2 and a touch panel driving device 3. The touch panel driving device 3 has a sensor integrated circuit (IC) 4 and an MCU 5.

The touch panel driving device 3 is connected to the touch panel 2 through a touch panel side connection terminal 31. With this connection, the touch panel driving device 3 performs driving (sensing) of the touch panel 2.

When mounted as an operation input device in a device, the touch panel driving device 3 is connected to the product side MCU 90 through a product side connection terminal 32. With this connection, the touch panel driving device 3 transmits the sensed operation information to the product side MCU 90.

The sensor IC 4 in the touch panel driving device 3 includes a transmission circuit 41, a reception circuit 42, a multiplexer 43, an interface register circuit 44, and a power supply circuit 45.

The transmission circuit 41 of the sensor IC 4 outputs a transmission signal to the terminal of the touch panel 2 selected by the multiplexer 43. The reception circuit 42 receives a signal from the terminal of the touch panel 2 selected by the multiplexer 43, and performs required comparison processing or the like.

Figure 2:
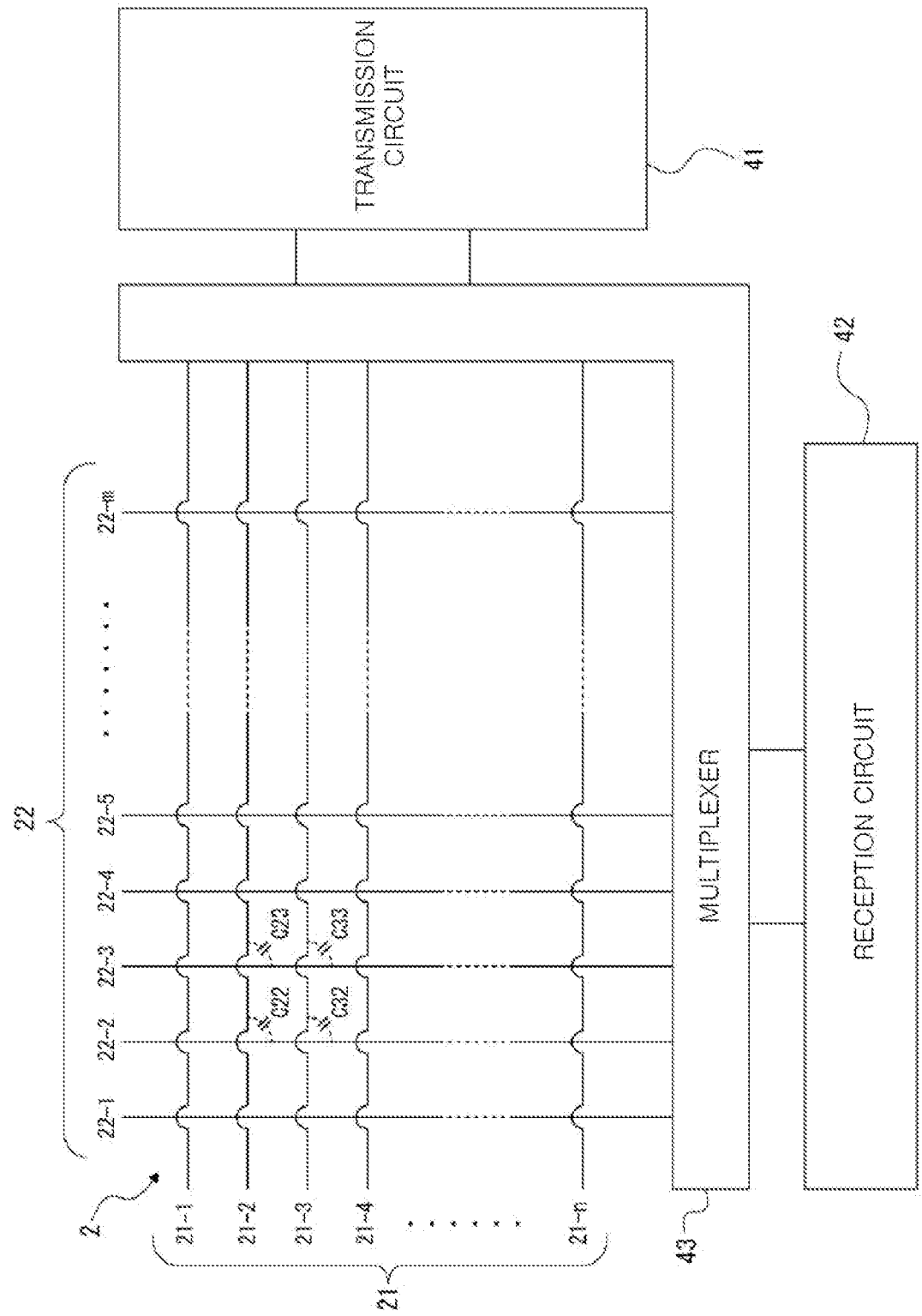
FIG. 2 is a diagram for explaining a configuration for a sensing operation of the touch panel according to the embodiment.

FIG. 2 schematically shows the connection state of the transmission circuit 41, the reception circuit 42, the multiplexer 43, and the touch panel 2.

In the touch panel 2, n transmission signal lines 21-1 to 21-$n$ serving as transmission side electrodes are arranged on a panel plane forming a touch surface.

Further, m reception signal lines 22-1 to 22-$m$ serving as reception side electrodes are arranged on the same panel plane.

When the transmission signal lines 21-1 to 21-$n$ and the reception signal lines 22-1 to 22-$m$ are not particularly distinguished, they are collectively referred to as "transmission signal line(s) 21" and "reception signal line(s) 22."

The transmission signal lines 21-1 to 21-$n$ and the reception signal lines 22-1 to 22-$m$ may intersect each other as illustrated in FIG. 2, or may be arranged in a so-called single layer structure without intersecting each other. In any case, a touch operation surface is formed within a range where the transmission signal line 21 and the reception signal line 22 are arranged, and an operation position is detected by capacitance changes during the touch operation.

FIG. 2 illustrates only some of the capacitances (capacitances C22, C23, C32, and C33) generated between the transmission signal line 21 and the reception signal line 22. However, the capacitances generated between the transmission signal line 21 and the reception signal line 22 exist on the entire touch operation surface, and the position where the capacitance changes due to the touch operation is detected by the reception circuit 42.

The transmission circuit 41 outputs a transmission signal to the transmission signal lines 21-1 to 21-$n$ selected by the multiplexer 43. In the present embodiment, the multiplexer 43 performs scanning by selecting two adjacent transmission signal lines 21 at each timing.

The reception circuit 42 receives reception signals from the reception signal lines 22-1 to 22-$m$ selected by the multiplexer 43. In the present embodiment, the multiplexer selects two adjacent reception signal lines 22 at each timing.

The sensing operation performed by the transmission circuit 41 and the reception circuit 42 will be described later.

Referring back to FIG. 1, various setting information of the transmission circuit 41, the multiplexer 43, the reception circuit 42, and the power supply circuit 45 is written in the interface register circuit 44 of the sensor IC 4 by the MCU 5.

The operations of the transmission circuit 41, the multiplexer 43, the reception circuit 42, and the power supply circuit 45 are controlled by the setting information stored in the interface register circuit 44.

Further, the detection value (also referred to as "RAW value") detected by the reception circuit 42 is stored in the interface register circuit 44 so that the MCU 5 can acquire it.

The power supply circuit 45 generates and supplies a driving voltage AVCC or the like to the transmission circuit 41 and the reception circuit 42. As will be described later, the transmission circuit 41 applies a pulse using the driving voltage AVCC or the like to the transmission signal line 21 selected by the multiplexer 43.

The reception circuit 42 applies the driving voltage AVCC or the like to the reception signal line 22 selected by the multiplexer 43 during the sensing operation.

The driving voltage AVCC illustrated in FIG. 1 is a term collectively referring to driving voltage(s) AVCC1, AVCC2, AVCC3, AVCC4 and the like to be described later.

The MCU 5 sets and controls the sensor IC4. Specifically, the MCU 5 controls operations of individual components of the sensor IC 4 by writing required setting information in the interface register circuit 44.

Further, the MCU 5 reads out the RAW value from the reception circuit 42 from the interface register circuit 44. Then, the MCU 5 performs coordinate calculation using the RAW value, and transmits the coordinate values as user's touch operation position information to the product side MCU 90.

In FIG. 1, a RAM area, a ROM area, a non-volatile storage area, and the like are collectively illustrated as a memory 5M in the MCU 5. The memory 5M is used for storing the setting information to be transmitted to the interface register circuit 44. The memory 5M is also used as a storage area for temporarily storing the detected RAW value or the coordinate values as the touch operation position information corresponding thereto.

FIG. 1 also shows a mode controller 5$a$ and a detection calculator 5$b$ in the MCU 5. They are a part of processing functions realized by a program (firmware, or the like) in the MCU 5. Especially, they are the functions provided for the processing of the present embodiment.

The mode controller 5$a$ has a processing function for performing scanning in the high-sensitivity mode setting to select a mode between a normal mode and a high-sensitivity mode. Here, the normal mode and the high-sensitivity mode indicate gain setting modes for the touch signal strength set in the reception circuit 42. The normal mode is a normal sensitivity gain setting mode, and the high-sensitivity mode is a high-sensitivity gain setting mode. The sensitivity is lower in the normal mode than in the high-sensitivity mode.

The mode controller 5a has a function of determining an appropriate mode for a touch operation and performing selection control.

The detection calculator 5b has a processing function for generating information indicating the touched position based on the RAW value obtained by scanning performed in the setting state of the mode selected by the mode controller 5a.

In other words, the coordinate calculation is performed using the RAW value, and the coordinate values as user's touch operation position information are obtained.

Due to the functions of the mode controller 5a and the detection calculator 5b, the processes shown in FIGS. 8 and 9 to be described later are performed.

Hereinafter, the sensing operation performed by the touch panel device 1 having the above configuration will be described.

Figure 3:
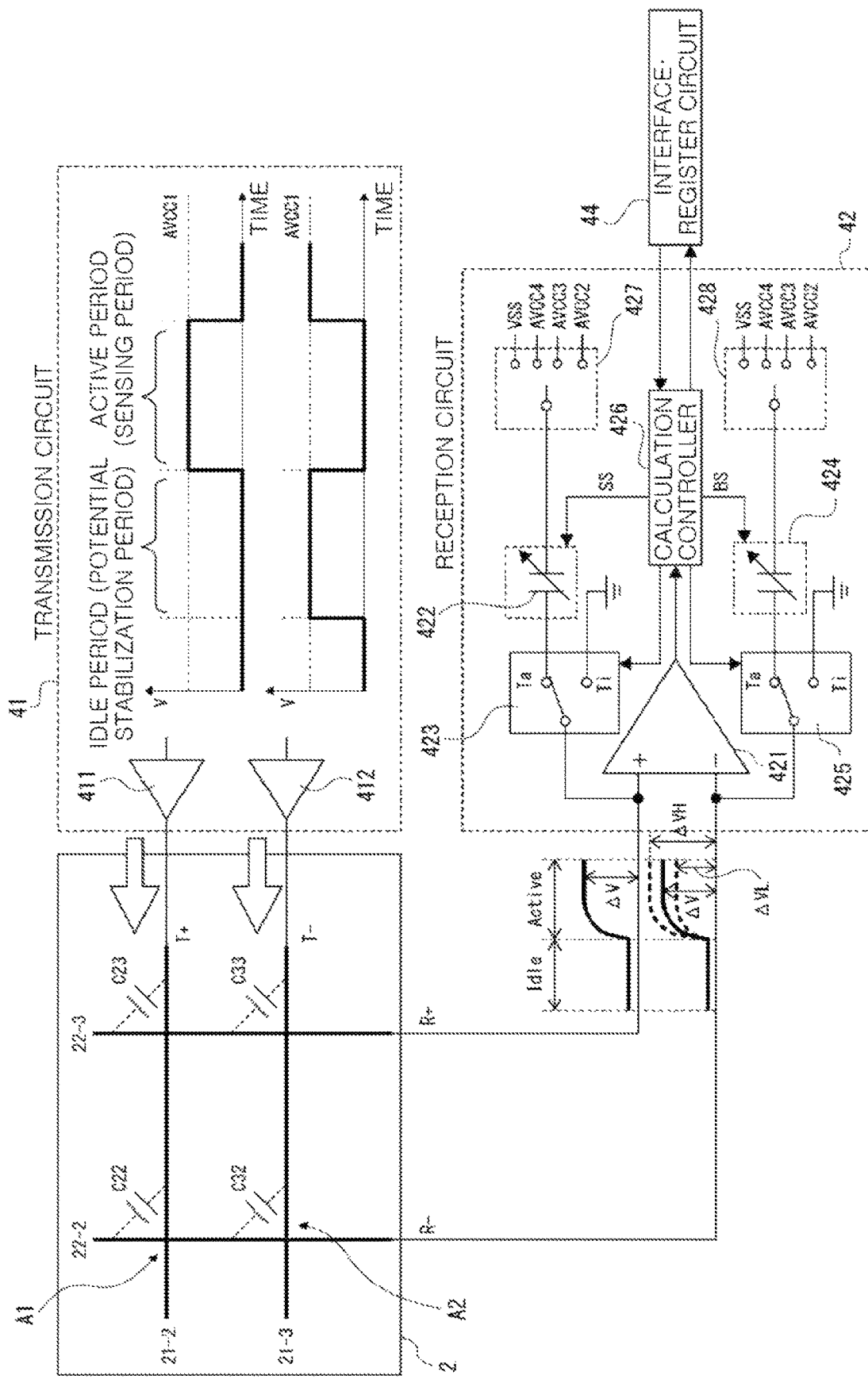
FIG. 3 is a diagram for explaining a transmission circuit and a reception circuit of the touch panel driving device according to the embodiment.

First, the operations of the transmission circuit 41 and the reception circuit 42 with respect to the touch panel 2 will be described with reference to FIG. 3. FIG. 3 shows two transmission signal lines 21-2 and 21-3 and two reception signal lines 22-2 and 22-3 on the touch panel 2.

In the present embodiment, the transmission circuit 41 and the reception circuit 42 transmit and receive two adjacent transmission signals and two adjacent reception signals among the transmission signal line 21 and the reception signal line 22 shown in FIG. 2, thereby detecting the touch operation. In other words, the detection scanning is sequentially performed in cell units while using, as a basic cell, a set of a pair of transmission signal lines 21 and a pair of reception signal lines 22, i.e., two transmission signal lines x two reception signal lines. In FIG. 3, one cell unit is illustrated.

The transmission circuit 41 outputs the driving voltages AVCC1 from drivers 411 and 412 to two transmission signal lines 21 (21-2 and 21-3 in the drawing). In other words, transmission signals T+ and T−, which are the outputs of the drivers 411 and 412, are supplied to the transmission signal lines 21-2 and 21-3 selected by the multiplexer 43.

The driving voltage AVCC1 is generated by the power supply circuit 45 of FIG. 1.

In this case, in the transmission circuit 41, an idle period (Idle) of the transmission signal T+ from the driver 411 is set to a low level (hereinafter, referred to as "L level"), e.g., 0V, as illustrated.

A subsequent active period (Active) is set to a high level (hereinafter, referred to as "H level"). In this case, the driving voltage AVCC1 is applied as an H level signal.

In the transmission circuit 41, the idle period of the transmission signal T− from the other driver 412 is set to an H level (application of the driving voltage AVCC1) and a subsequent active period is set to an L level.

Here, the idle period is a period for stabilizing potentials of reception signals R+ and R−, and the active period is a period for sensing potential changes of the reception signals R+ and R−.

During the idle period and the active period, the reception circuit 42 receives the reception signals R+ and R− from the two reception signal lines 22 (22-3 and 22-2 in the drawing) selected by the multiplexer 43.

The reception circuit 42 includes a comparator 421, a reference capacitance part 422, switches 423, 425, a measurement capacitance part 424, a calculation controller 426, and voltage selectors 427 and 428.

The reception signals R+ and R− from the two reception signal lines 22 are received by the comparator 421.

The comparator 421 compares the potentials of the reception signals R+ and R−, and outputs the comparison result to the calculation controller 426 at the H level or the L level.

One of the driving voltages VSS, AVCC4, AVCC3, and AVCC2 is applied to one end of the capacitor constituting the reference capacitance part 422 through the voltage selector 427. These driving voltages are generated by the power supply circuit 45 of FIG. 1.

The other end of the capacitor constituting the reference capacitance part 422 is connected to the "+" input terminal of the comparator 421 through a terminal Ta of the switch 423.

One of the driving voltages VSS, AVCC4, AVCC3, and AVCC2 is applied to one end of the capacitor constituting the measurement capacitance part 424 through the voltage selector 428. The voltage selector 428 selects the same voltage as that selected by the voltage selector 427.

The other end of the capacitor constituting the measurement capacitance part 424 is connected to the "−" input terminal of the comparator 421 through the terminal Ta of the switch 425.

A terminal Ti is selected in the switches 423 and 425 during the idle period. Therefore, during the idle period, the "+" input terminal (the reception signal line 22-3) and the "−" input terminal (the reception signal line 22-2) of the comparator 421 are connected to the ground, and the reception signals R+ and R− reach the ground potential.

The terminal Ta is selected in the switches 423 and 425 during the active period. Therefore, during the active period, the driving voltage AVCC (e.g., the driving voltage AVCC2) is applied to the "+" input terminal (the reception signal line 22-3) and the "−" input terminal (the reception signal line 22-2) of the comparator 421.

In FIG. 3, the waveforms of the reception signals R+ and R− in a non-touch state of the corresponding cell are expressed by solid lines. In the idle period, the switches 423 and 425 select the terminal Ti, so that the reception signals R+ and R− are stabilized at a certain potential (ground potential).

In the active period, the switch 423 and 425 select the terminal Ta, so that the driving voltage AVCC (e.g., the driving voltage AVCC2) is applied to the reception signal lines 22-3 and 22-2. Accordingly, the potentials of the reception signals R+ and R− increase by ΔV. In the non-touch state, the potential increases by ΔV in both the reception signals R+ and R−.

On the other hand, on the transmission circuit 41 side, during the active period, the transmission signal T+ rises and the transmission signal T− falls as described above. Accordingly, when a touch operation is detected, a degree of potential increase of the reception signals R+ and R− changes.

If an A1 position that affects the capacitance C22 is touched, the potential of the reception signal R− increases by ΔVH as indicated by a dashed line in the active period.

If an A2 position where the capacitance C32 changes is touched, the potential of the reception signal R− increases by ΔVL as indicated by a dashed line in the active period.

The potential change amount of the reception signal R− becomes greater or smaller than the potential change amount ΔV of the reception signal R+ depending on the touch operation position on the cell.

The comparator 421 compares the reception signals R+ and R−.

The potential difference between the reception signals R+ and R− that changes as described above may be outputted as the RAW value (detection result). However, in the present embodiment, in the reception circuit 42, the calculation controller 426 obtains the RAW value by changing the capacitance value setting of the measurement capacitance part 424 such that the voltage balance of the signals R+ and R− can be maintained.

The calculation controller 426 controls turning on/off of the switches 423 and 425.

Further, the calculation controller 426 controls switching of the capacitance value of the measurement capacitance part 424 using a bit signal BS.

Further, the calculation controller 426 can set the touch signal detection sensitivity mode by performing the switching control of the capacitance value of the reference capacitance part 422 using the mode control signal SS. The capacitance of the reference capacitance part 422 is a fixed value during scanning, but is switched by changing the sensitivity mode.

The processing of the calculation controller 426 is performed based on the setting information written in the interface register circuit 44, i.e., based on the operation setting of the MCU 5.

The calculation controller 426 monitors the output of the comparator 421 and calculates the RAW value. The RAW value calculated by the calculation controller 426 is written in the interface register circuit 44 so that the MCU 5 can acquire it.

Figure 4:
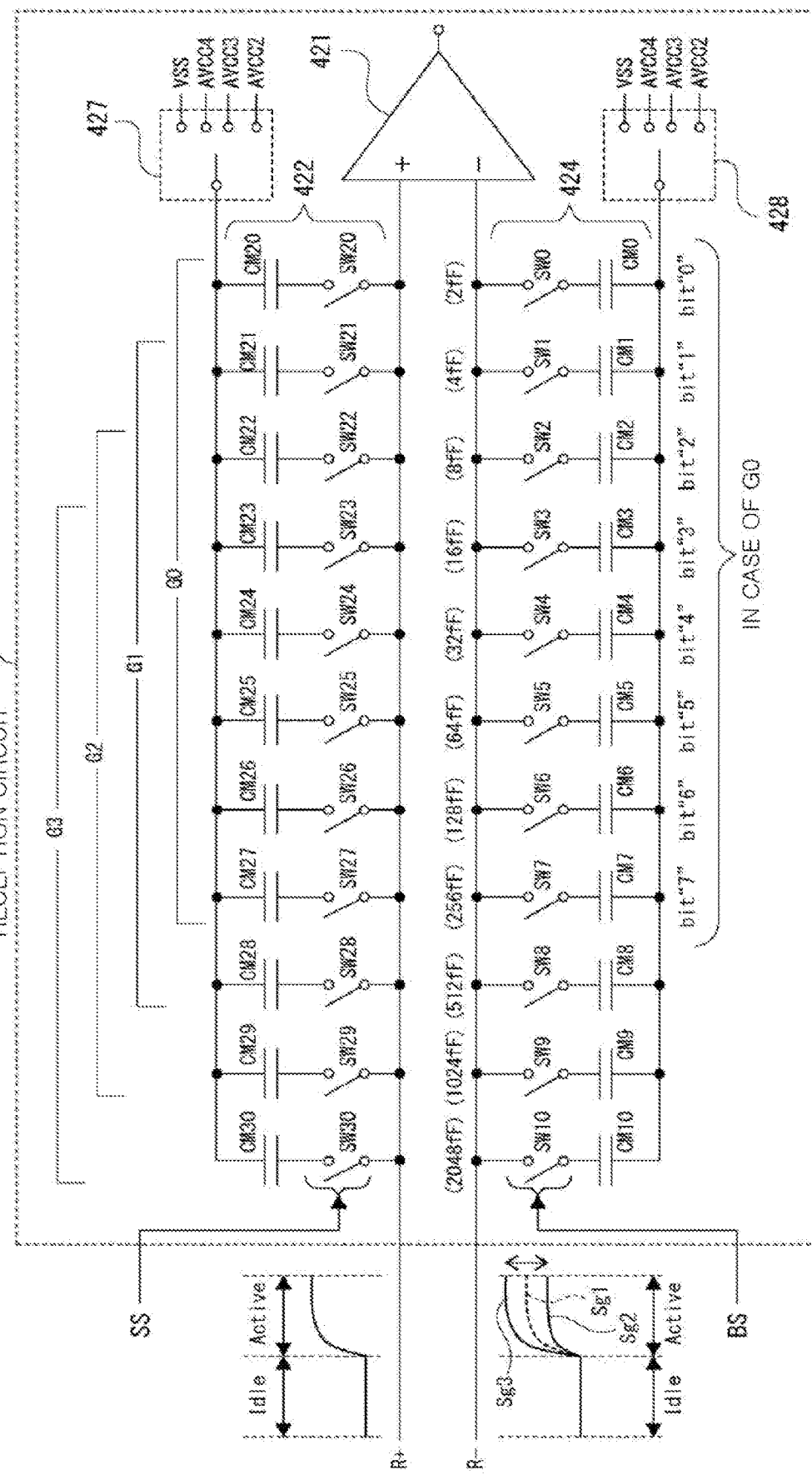
FIG. 4 is a diagram for explaining a configuration for capacitance switching of the reception circuit in the embodiment.

The measurement capacitance part 424 indicated by the symbol of the variable capacitor in FIG. 3 includes, e.g., a plurality of (eleven in this example) capacitors CM (CM0 to CM10) and a plurality of (eleven in this example) switches SW (SW0 to SW10) as shown in FIG. 4. Further, the reference capacitance part 422 includes eleven capacitors CM (CM20 to CM30) and eleven switches SW (SW20 to SW30), similarly to the measurement capacitance part 424.

The capacitors CM0 to CM30 and the switches SW0 to SW30 are collectively referred to as "capacitor(s) CM" and "switch(es) SW", respectively.

FIG. 4 shows an equivalent circuit in a state where the switches 423 and 425 shown in FIG. 3 are connected to the terminal Ta (active period), and the switches 423 and 425 are not illustrated in FIG. 4.

The capacitor CM0 and the switch SW0, the capacitor CM1 and the switch SW1, . . . , the capacitor CM10 and the switch SW10 in the measuring capacitance part 424 are connected in series, respectively. The set of the eleven capacitors CM and the eleven switches SW connected in series are connected in parallel between the potential of the driving voltage AVCC (e.g., the driving voltage AVCC2) and the "−" input terminal of the comparator 421.

Therefore, the capacitance value of the measurement capacitance part 424 that affects the reception signal R− can be changed by the turn on/off of the switches SW0 to SW10. The turn on/off of each switch SW in the measurement capacitance part 424 is controlled by the bit signal BS.

Each of the switches SW0 to SW10 may include a switch element such as a field effect transistor (FET) or the like. However, a plurality of switch elements may be provided as a single switch SW.

The capacitor CM20 and the switch SW20, the capacitor CM21 and the switch SW21, . . . , the capacitor CM30 and the switch SW30 in the reference capacitance part 422 are connected in series, respectively. The set of the eleven capacitors CM and the eleven switches SW connected in series is connected in parallel between the potential of the driving voltage AVCC (e.g., the driving voltage AVCC2) and the "+" input terminal of the comparator 421.

Therefore, the capacitance value of the reference capacitance part 422 can be changed by the turn on/off of the switches SW20 to SW30. The turn on/off of each switch SW in the reference capacitance part 422 is controlled by the mode control signal SS. The switch SW20 to SW30 include the switch element such as a FET or the like.

Here, the capacitance value is changed in 256 levels by 8 bits among 11 bits of the bit signal BS in the measurement capacitance part 424 during scanning, for example. In the example of FIG. 4, the measurement capacitance part 424 includes the set of the eleven capacitors CM and the eleven switches SW. However, when the capacitance value is changed in 256 levels, for example, eight sets may be sufficient. For example, each of the switches SW0 to SW7 is controlled to be turned on/off to correspond to each bit of the bit signal BS, the capacitance value in the measurement capacitance part 424 can be changed in 256 levels. Here, the eleven sets are provided to change the reception sensitivity mode.

The reference capacitance part 422 may include one capacitor CM because a fixed capacitance value having a median value of 256 levels, e.g., a capacitance value corresponding to "128" is sufficient. However, similarly to the measuring capacitance part 424, eleven sets are provided as illustrated in the drawing to change the reception sensitivity mode.

Gain settings G0, G1, G2, and G3 are shown at the upper part of FIG. 4.

In the gain setting G0, the capacitors CM20 to CM27 are used.

In the gain setting G1, the capacitors CM21 to CM28 are used.

In the gain setting G2, the capacitors CM22 to CM29 are used.

In the gain setting G3, the capacitors CM23 to CM30 are used.

In other words, the reception signal sensitivity mode can be changed in four levels by changing the gain settings G0, G1, G2, and G3.

For example, in the gain setting G0, the reference capacitance part 422 sets a capacitance value corresponding to "128" using the capacitors CM20 to CM27.

The mode control signal SS is actually an 11-bit signal corresponding to the switches SW20 to SW30. However, in the case of the gain setting G0, the bits corresponding to the switches SW28, SW29, and SW30 in the mode control signal SS have a logic value for controlling the switches to be turned off at all times. Further, each bit corresponding to the switches SW20 to SW27 is set to a predetermined value, so that the capacitance value corresponding to "128" can be adjusted using the capacitors CM20 to CM27. By using eight capacitors CM, the capacitance value in the reference capacitance part 422, i.e., the capacitance value corresponding to "128" can be adjusted.

Similarly, for example, in the gain setting G1, the reference capacitance part 422 sets the capacitance value corresponding to "128" using the capacitors CM21 to CM28. In the gain setting G2, the reference capacitance part 422 sets the capacitance value corresponding to "128" using the capacitors CM22 to CM29. In the gain setting G3, the reference capacitance part 422 sets the capacitance value corresponding to "128" using the capacitors CM23 to CM30.

The measurement capacitance part 424 uses the capacitor CM as follows depending on the gain setting in which the reception sensitivity is changed.

In the gain setting G0, the capacitors CM0 to CM7 are used.

In the gain setting G1, the capacitors CM1 to CM8 are used.

In the gain setting G2, the capacitors CM2 to CM9 are used.

In the gain setting G3, the capacitors CM3 to CM10 are used.

For example, in the gain setting G0, the measurement capacitance part 424 changes the capacitance value using the capacitors CM0 to CM7 in 256 levels.

The bit signal BS is actually an 11-bit signal corresponding to the switches SW0 to SW10. However, in the case of the gain setting G0, the bits corresponding to the switches SW8, SW9, and SW10 in the bit signal BS have a logic value for controlling the switches to be turned off at all times. Further, each bit corresponding to the switches SW0 to SW7 is changed to adjust the capacitance value in 256 levels using the capacitors CM0 to CM7.

For example, the capacitance value of each capacitor in the reference capacitance part 422 and the measurement capacitance part 424 is set as follows.

The capacitors CM0 and CM20 have a capacitance value of 2 fF (femtofarad). The capacitors CM1 and CM21 have a capacitance value of 4 fF. The capacitors CM2 and CM22 have a capacitance value of 8 fF. The capacitors CM3 and CM23 have a capacitance value of 16 fF. The capacitors CM4 and CM24 have a capacitance value of 32 fF. The capacitors CM5 and CM25 have a capacitance value of 64 fF. The capacitors CM6 and CM26 have a capacitance value of 128 fF. The capacitors CM7 and CM27 have a capacitance value of 256 fF. The capacitors CM8 and CM28 have a capacitance value of 512 fF. The capacitors CM9 and CM29 have a capacitance value of 1024 fF. The capacitors CM10 and CM30 have a capacitance value of 2048 fF.

In FIG. 4, each capacitor CM includes one capacitor. However, all or some of the capacitors CM may include a plurality of capacitors. In that case, the combined capacitance value may be the above capacitance value.

For example, in the case of the gain setting G0, the capacitors CM0 to CM7 are selected for 8-bit values of bit "0" to bit "7" among the 11 bits of the bit signal BS. The capacitor CM0 and the switch SW0 function as bit "0", the capacitor CM1 and the switch SW1 function as bit "1", . . . , and the capacitor CM7 and the switch SW7 function as bit "7".

A capacitance setting value ranges from 0 (="0000000000") to 255 (="11111111") by the 8-bit value. The capacitance setting value is one of the setting information written in the interface register circuit 44 by the MCU 5.

In the reception circuit 42, the switches SW0 to SW7 are switched on/off depending on the 8-bit capacitance setting value. In other words, the switches SW0 to SW7 are switched off when the corresponding bit is "0" and switched on when the corresponding bit is "1". Hence, the total capacitance value of the measurement capacitance part 424 is changed in 256 levels within a range of 0 fF to 510 fF.

On the other hand, the capacitance value set by the capacitors CM27 to CM20 of the reference capacitance part 422 on the reception signal R+ side, i.e., the capacitance value corresponding to "128" is, e.g., 256 fF.

As described above, a degree of potential increase of the waveform of the reception signal R− in the active period changes depending on whether or not a touch operation is detected and on a touch position. The waveform rise amount of the reception signal R− is greater or smaller than the waveform rise amount ΔV of the reception signal R+.

In the configuration of FIG. 4, the potential increase amount of the waveform of the reception signal R− can be changed by changing the capacitance setting value of the measurement capacitance part 424. For example, the capacitance setting value of the measurement capacitance part 424 at which the reception signal R+ and the reception signal R− have the same voltage can be obtained.

For example, when a waveform Sg1 of the reception signal R− indicated by a dashed line in FIG. 4 is set to an initial state, if the capacitance of the measurement capacitance part 424 is reduced, the reception signal R− has a waveform Sg2 lower than the waveform Sg1. If the capacitance of the measurement capacitance part 424 is increased, the reception signal R− has a waveform Sg3 higher than the waveform Sg1.

In other words, the capacitance setting value of the measurement capacitance part 424 at which the voltage levels of the reception signals R+ and R− are equal in the comparator 421 becomes equivalent to the value corresponding to the voltage change of the reception signal R− due to the touch.

Therefore, the capacitance setting value at which the voltages during the active periods of the reception signals R+ and R− become equal is searched by sequentially changing the capacitance setting value of the measurement capacitance part 424 while monitoring the output of the comparator 421. Then, the searched capacitance setting value is used as the RAW value as the sensing information for the touch operation.

Although the example of the gain setting G0 has been described, the RAW value can be detected in the same manner in other gain settings. In other words, eight capacitor CMs used for setting the capacitance value corresponding to "128" in the reference capacitance part 422 and eight capacitors CM used for changing the capacitance value in 256 levels in the measurement capacitance part 424 are different for each gain setting as described above.

The sensitivity of the touch signal detection can be increased in the order of the gain setting G3, G2, G1 and G0. Specifically, the capacitance value of the capacitor CM selected in the order of the gain settings G3, G2, G1 and G0 becomes smaller, so that the voltage per one resolution can be detected finely. Therefore, a smaller change in the capacitance (voltage) can be amplified and detected as a large change amount of the RAW value. For example, in the example of FIG. 4, the change amount of the RAW value can be amplified by twice and detected by switching the gain setting to the high sensitivity side by one level.

2. Processing of a First Embodiment

With the above configuration, in the present embodiment, it is possible to perform high-precision touch detection in both the finger touch and the glove touch. In order to do so, the reception sensitivity mode corresponding to the gain setting is automatically switched to an optimal state.

There is a difference in the touch signal strength between the finger touch that is a direct touch of a finger and the glove touch that is a touch of a finger wearing a glove. Further, the touch signal strength varies depending on the type of a glove, e.g., whether the glove is of a fabric or a leather. Therefore, an appropriate sensitivity (gain setting) is different between the glove touch and the finger touch.

Therefore, a threshold value is set for the touch signal strength, and the normal sensitivity gain setting mode (hereinafter referred to as "normal mode") is selected when the touch signal strength is greater than or equal to the threshold value, and the high-sensitivity gain setting mode (hereinafter referred to as "high-sensitivity mode") is selected when the touch signal strength is smaller than the threshold value.

A signal used for the determination based on the threshold value has the following touch signal strength Z calculated from the RAW value obtained by the high-sensitivity mode setting scanning. By using the scanned signal value in the high-sensitivity mode setting, the level difference between the non-touch, the glove touch, and the finger touch can be clearly identified.

In the normal mode setting, the touch signal strength Z in the glove touch is very weak, so that it is easily affected by a noise. Further, it is difficult to distinguish the non-touch and the glove touch, which makes it difficult to accurately detect the state and select the sensitivity.

The touch signal strength Z will be described.

Figure 5A:
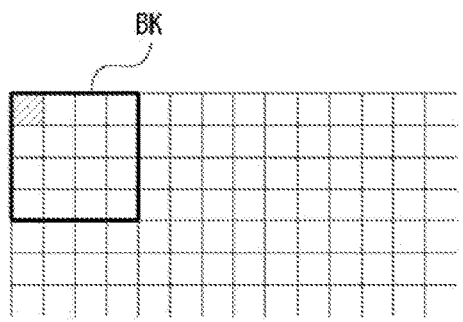
FIGS. 5A to 5D are diagrams for explaining a block of a touch signal detector in performing scanning in the embodiment.
Figure 5B:
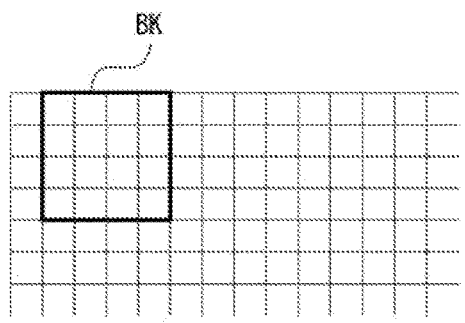
Figure 5C:
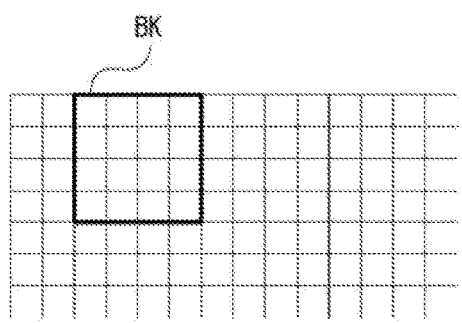

A single square in FIGS. 5A, 5B, and 5C indicates the above-described cell, i.e., a set of two transmission signal lines 21 and two reception signal lines 22.

Figure 5D:

Sixteen cells (4×4) are illustrated as one block BK, and the RAW value of each cell of the block BK is represented as "a" to "p" as shown in FIG. 5D. "a" to "p" are the RAW values obtained by scanning each cell. For example, in the block BK of FIG. 5A, "a" is the RAW value of the shaded cell.

In the reception circuit 42, each cell is scanned to detect the RAW value with a resolution of 256 levels as described above. In the MCU 5, the touch position coordinates are obtained from the RAW value of each cell.

In that case, the pattern of the RAW value is determined while sequentially switching the selection of 16 cells forming the block BK as shown in FIGS. 5A, 5B, and 5C.

Figure 6:
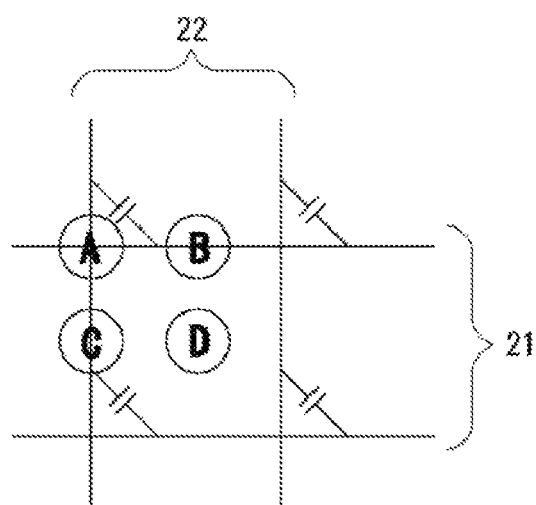
FIG. 6 is a diagram for explaining touch positions in a set of a pair of signal lines in the embodiment.

FIG. 6 shows one cell and touch positions "A", "B", "C", and "D" in the cell.

When the touch position is "A", the RAW value of the A pattern in FIG. 7 is obtained in the block BK having 16 cells including the corresponding cell. "+" indicates that the RAW value is greater than "128", and "−" indicates that the RAW value is smaller than "128".

Similarly, when the touch positions are "B", "C", and "D" in FIG. 6, the RAW values in the block BK including the corresponding cell have a B pattern, a C pattern, and a D pattern in FIG. 7, respectively.

By detecting such patterns, the MCU 5 can obtain the touch position coordinates with a resolution finer than the cell size.

The touch signal strength Z can be obtained from the RAW value of each cell for each block BK, for example, as follows.

touch signal strength Z=(a+b+e+f)+(k+l+o+p)−(c+d+g+h)−(i+j+m+n)

Figure 8:
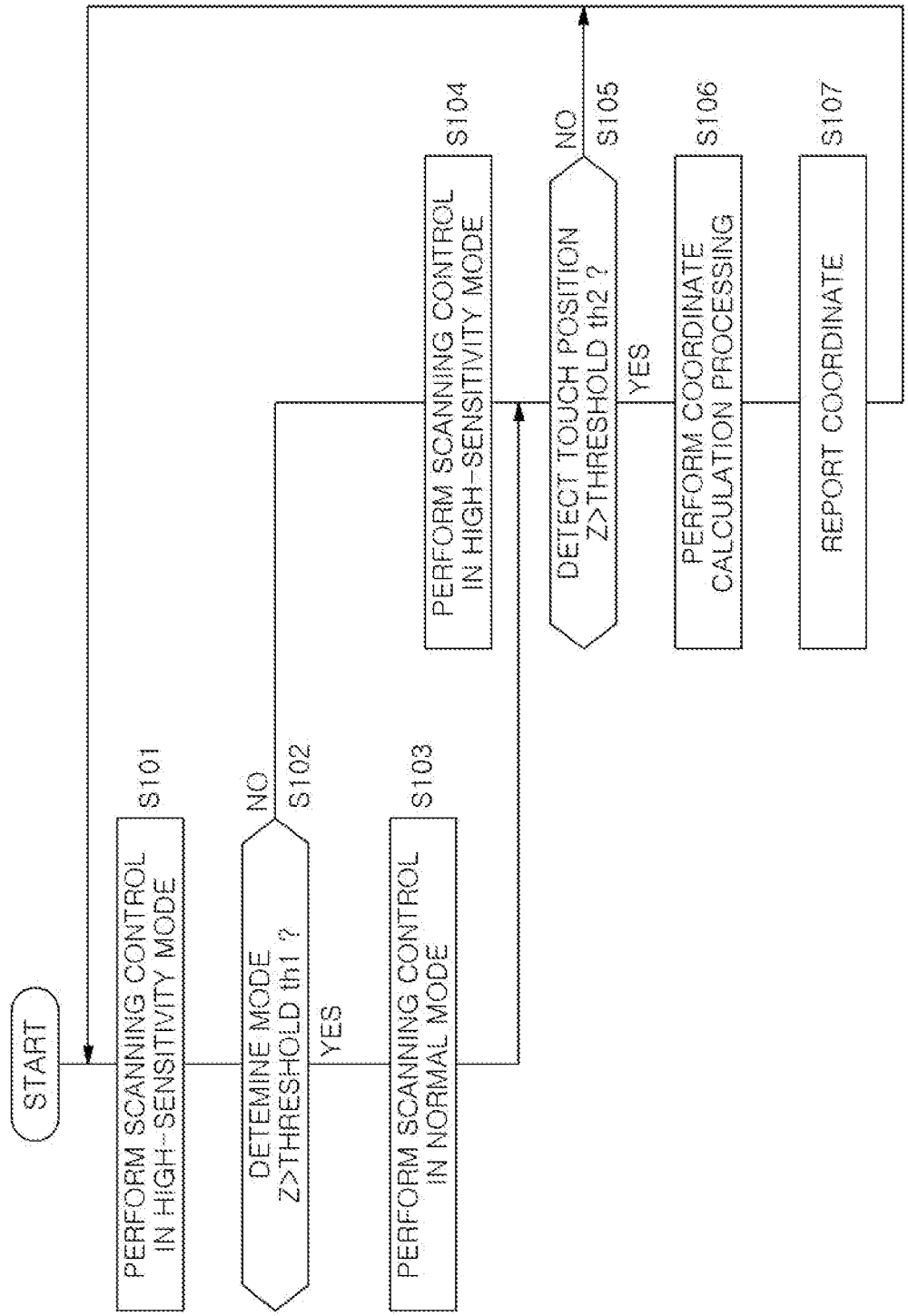
FIG. 8 is a flowchart of a sensing process in a first embodiment.

FIG. 8 explains a processing example of a first embodiment in which an appropriate mode is determined using the touch signal strength Z and the reception signal sensitivity mode is automatically switched.

FIG. 8 shows a processing example executed by the functions of the mode controller 5a and the detection calculator 5b in the MCU 5. The processing of FIG. 8 and the processing of FIG. 9 to be described later are repeated until the operation detection using the touch panel 2 is completed (e.g., until the power is off).

For example, the high-sensitivity mode may be the mode of the gain setting G0, and the normal mode may be the mode of the gain setting G2.

In step S101, the MCU 5 performs scanning control in the high-sensitivity mode. In other words, the MCU 5 instructs the reception circuit 42 to perform the scanning in the high-sensitivity mode. The reception circuit 42 scans each cell in the mode of the gain setting G0. The MCU 5 acquires the RAW value of each cell as a result of the scanning.

The MCU 5 can calculate the touch signal strength Z in the unit of the block BK from the acquired RAW value of each cell. By determining the block BK having the highest touch signal strength Z, the touch signal strength Z corresponding to the touch can be determined.

In step S102, the MCU 5 compares the touch signal strength Z with a threshold value th1 and determines whether or not the condition Z>th1 is satisfied in order to determine a mode.

In this step, it is determined whether the touch signal strength Z is a relatively large value indicating the finger touch or a relatively small value indicating the glove touch.

When the condition Z>th1 is satisfied, the MCU 5 determines that the finger touch is detected and proceeds to step S103 to cause the reception circuit 42 to perform scanning in the normal mode. Accordingly, the reception circuit 42 scans each cell in the mode of the gain setting G2. The scanning at this time is to determine the actual touch position. The MCU 5 acquires the RAW value of each cell as a result of the scanning.

On the other hand, if it is determined in step S102 that the condition Z>th1 is not satisfied, the MCU 5 determines that the glove touch is detected, and proceeds to step S104 to cause the reception circuit 42 to perform scanning in the high-sensitivity mode. Accordingly, the reception circuit 42 performs the scanning of each cell in the mode of the gain setting G0. The scanning at this time is to determine the actual touch position. The MCU 5 acquires the RAW value of each cell as a result of the scanning.

After the RAW value for each cell is obtained by the scanning in step S103 or S104, the MCU 5 determines whether or not to perform touch position detection in step S105. Therefore, the touch signal strength Z is obtained from the RAW value of each cell obtained by the scanning in step S103 or S104, and is compared with a threshold value th2. The threshold value th2 is used for determining whether or not to perform the touch position detection. The threshold value th2 is smaller than the threshold value th1, for example. For example, the threshold value th2 is set to a value for preventing erroneous touch detection due to a noise or the like.

If the touch signal strength Z is small so that the condition Z>th2 is not satisfied, the process returns to step S101.

If the condition Z>th2 is satisfied, the MCU 5 proceeds to step S106 and performs coordinate calculation processing. When the MCU 5 obtains the coordinate values as the touch position, the coordinate values are outputted as a coordinate report in step S107. In other words, the coordinate values are notified to the product side MCU 90 of FIG. 1. Then, the process returns to step S101.

By the above processing, when a touch operation is performed, an appropriate mode is automatically selected between the normal mode and the high-sensitivity mode, and the touch position is detected by the selected mode.

3. Processing of a Second Embodiment

Figure 9:
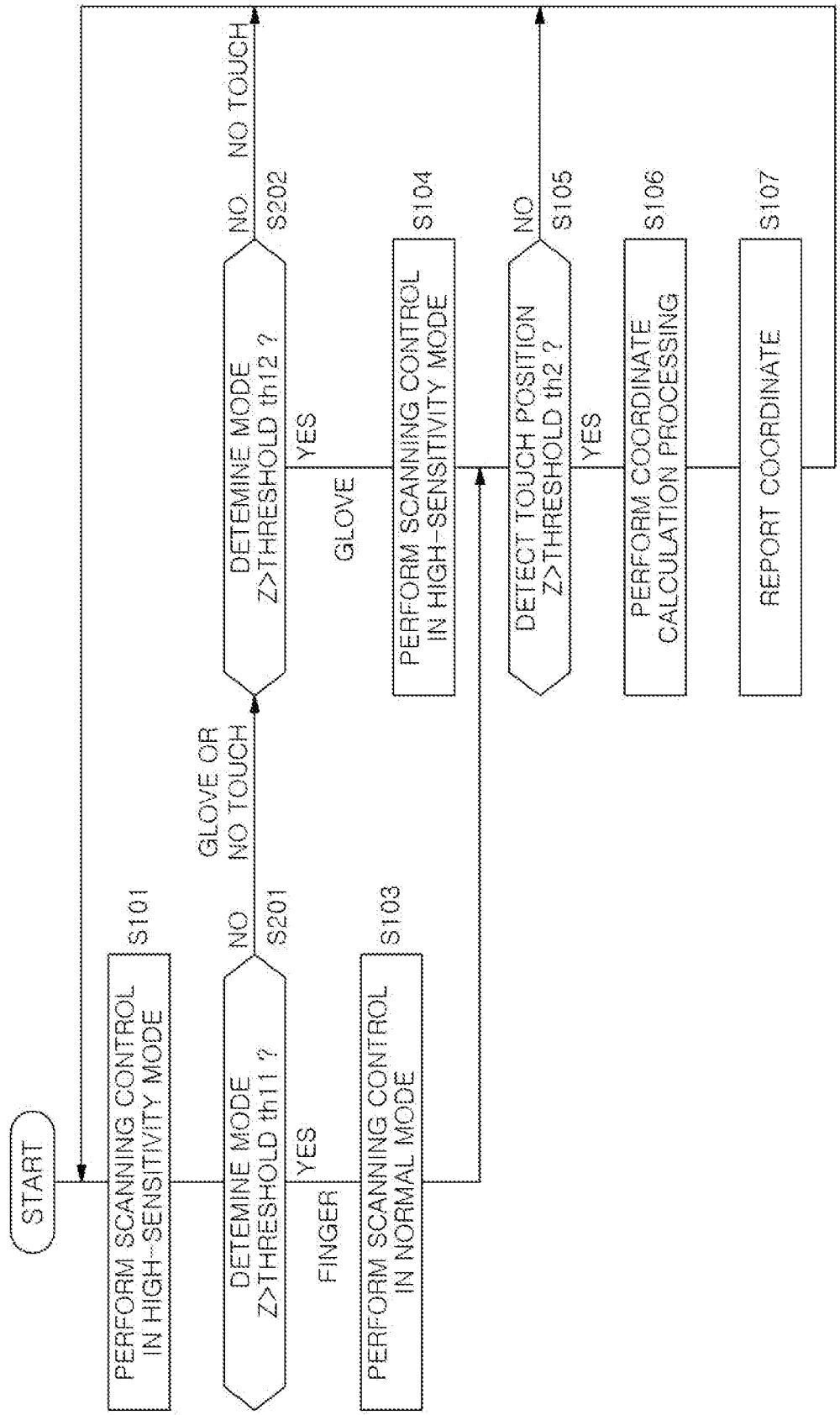
FIG. 9 is a flowchart of a sensing process in a second embodiment.

FIG. 9 shows a processing example of a second embodiment. In this processing example, the finger touch, the glove touch, and the non-touch (hereinafter, also referred to as "no touch") are determined in the mode determination step.

The same processes as those in FIG. 8 have the same reference numerals and detailed description thereof are omitted. The processing of FIG. 9 is different from the processing of FIG. 8 in that steps S201 and S202 are performed as the mode determination steps.

After the MCU 5 instructs the scanning in the high-sensitivity mode in the reception circuit 42 in step S101, the touch signal strength Z and a first threshold value th11 are compared in step S201.

The first threshold value th11 is used for determining the finger touch by which the touch signal strength Z becomes considerably high in the high-sensitivity mode.

If the condition Z>th11 is satisfied, the MCU 5 determines that the finger touch is detected, and proceeds to step S102.

If the condition Z>th11 is not satisfied, the MCU 5 determines that the finger touch is not detected, and proceeds to step S202 to compare the touch signal strength Z with a second threshold value th12.

The second threshold value th12 is smaller than the first threshold value th11, and used for determining the glove touch and no touch. For example, although the magnitude of the touch signal strength Z may be different depending on types of gloves, the second threshold value th12 may be set to a level at which the glove touch can be determined when a glove with the lowest touch signal strength Z among commonly used gloves.

If the condition Z>th12 is satisfied, the MCU 5 determines that the glove touch is detected, and proceeds to step S104. If the condition Z>th12 is not satisfied, the MCU 5 determines that no touch is detected, and returns to step S101.

The finger touch, the glove touch, and no touch can be determined by the above processing. When the finger touch or the glove touch is detected, the appropriate mode is automatically selected between the normal mode and the high-sensitivity mode, and the touch position detection is performed in response to the selected mode.

4. Effects of Embodiments and Modifications

The following effects can be obtained in the sensing method performed in the touch panel device 1 and the touch panel driving device 3 described in the above embodiments.

In an embodiment, the touch panel driving device 3 performs scanning of sequentially selecting a pair of adjacent transmission signal lines 21 and a pair of adjacent reception signal lines 22 on the touch panel 2, and a mode can be selected between the normal mode (example of a first mode) and the high-sensitivity mode (example of a second mode) in which the sensitivity is higher than that in the normal mode as the reception signal sensitivity of the pair of reception signal lines 22.

The sensing method includes a first sequence controlled by the mode controller 5a and a second sequence controlled by the detection calculator 5b.

In the first sequence, the normal mode or the high-sensitivity mode is selected by performing scanning in the high-sensitivity mode setting. In other words, the first procedure is an operation controlled by steps S101 and S102 in FIG. 8 or steps S101, S201 and S202 in FIG. 9.

In the second sequence, a touch is detected by performing scanning in the mode setting state selected in the first sequence, and information indicating the touched position is generated. In other words, the second sequence is an operation controlled by steps S103 to S107 of FIGS. 8 and 9.

Two sensitivity settings, i.e., low gain setting and high gain setting, may be built in one firmware, and the low gain setting and the high gain setting are automatically selected and switched depending on a signal state obtained when a touch operation is detected.

By automatically determining and selecting an appropriate mode between the normal mode and the high-sensitivity mode depending on the touch, appropriate touch detection can be performed regardless of a finger touch and a glove touch. In other words, both the finger touch operation and the glove touch operation can be realized.

A user may perform both the finger touch and the glove touch. Further, an operation of manually switching a mode is not required. Accordingly, it is possible to provide a touch panel that is extremely easy to use and realizes a stress-free operation.

In the processing example of FIG. 8 as the first embodiment, in the first sequence, the mode is selected based on the result of comparison between the touch signal strength Z detected during the scanning in the high-sensitivity mode setting and the threshold value th1.

By detecting the touch signal strength in the high-sensitivity mode and comparing it with the threshold value th1, it is possible to determine whether the detected touch corresponds to the high-sensitivity mode or the normal mode. This is because a certain touch signal strength is obtained by a glove touch, and a higher touch signal strength is obtained by a finger touch. Accordingly, it is possible to accurately determine an appropriate mode for a current touch operation.

In the above embodiment, an example has been described in which the gain setting G2 is set to the normal mode and the gain setting G0 is set to the high-sensitivity mode, and the mode selection is automatically performed. However, with the configuration of FIG. 4, four-level sensitivity modes of the gain settings G0, G1, G2, and G3 can be selected. Any two of them may be set to the normal mode and the high-sensitivity mode, or three or four modes may be automatically switched. For example, three or four modes can be automatically selected by classifying the value of the touch signal strength Z detected during the scanning in the high-sensitivity mode into three or four levels by multiple threshold values.

In the processing example of FIG. 9 as the second embodiment, in the first procedure, whether or not the touch corresponds to the normal mode is determined based on the result of comparison between the touch signal strength Z detected during the scanning in the high-sensitivity mode setting and the first threshold value th11, and whether or not the touch corresponds to the high-sensitivity mode is determined based on the result of comparison between the touch signal strength Z with the second threshold value th12 corresponding to a lower signal strength value compared to the first threshold value th11. When it is determined that the touch corresponds to the normal mode or the high-sensitivity mode, the mode is selected and the scanning for actual touch detection (steps S103 and S104) is executed.

Accordingly, it is possible to appropriately select between the normal mode and the high-sensitivity mode. The mode switching process is not performed during a no-touch period in which a touch operation is not detected. Hence, the processing load can be reduced. Further, during the no-touch period, the scanning of step S101 is repeated. Therefore, when a touch operation is detected, the mode can be determined immediately and the scanning for touch position detection can be executed, which is advantageous in terms of the responsiveness of touch detection.

As described in the embodiment, if only the gain setting is switched in the mode switching, the RAW value during scanning may not be balanced due to the variation in the parasitic capacitance or the characteristics of an AD converter of an IC, especially in the case of high gain setting. Therefore, in the reception signal sensitivity mode switching, not only the gain setting switching using the reference capacitance part 422 and the measurement capacitance part 424, but also the scan pattern conditions such as a charge/discharge time or edge tuning adjustment conditions may be switched.

For example, the scan pattern conditions are set as a scan pattern file, and the scan pattern file may be adjusted for each of the low gain setting and the high gain setting, built and maintained in the firmware. When the mode is switched, the scan pattern conditions corresponding to each gain setting can be selected.

Although a case in which a touch operation is directly performed on the panel surface in the touch panel device 1 of the embodiment has been described, the present disclosure also includes a touch panel device supporting so-called hover sensing (non-contact proximity operation) which allows a hovering operation as being equivalent to a direct touch operation. In that case, the above sensing method can be applied too. In other words, the term "touch" in the present disclosure and the embodiment also includes a non-contact proximity operation state.

The invention claimed is:

1. A sensing method of a touch panel driving device configured to perform scanning of sequentially selecting a pair of adjacent transmission signal lines and a pair of adjacent reception signal lines on a touch panel and select between a first mode and a second mode having higher sensitivity than the first mode as reception signal sensitivity of a pair of reception signal lines, comprising:
   a first sequence of performing the scanning in setting of the second mode to select the first mode or the second mode; and
   a second sequence of performing the scanning in the setting state of the mode selected in the first sequence to perform touch detection and generating information indicating a touched position,
   wherein in the first sequence, determining whether or not a touch corresponds to the first mode based on a comparison between a touch signal strength detected during the scanning in the setting of the second mode and a first threshold value,
   determining whether the touch corresponds to the second mode or there is no touch based on a comparison between the touch signal strength with a second threshold value corresponding to a lower signal strength than the first threshold value, and
   when it is determined that the touch corresponds to the first mode or the touch corresponds to the second mode, the mode is selected.

2. A touch panel driving device configured to perform scanning of sequentially selecting a pair of adjacent transmission signal lines and a pair of adjacent reception signal lines on a touch panel, comprising;
   a reception circuit configured to select between a first mode and a second mode having higher sensitivity than the first mode as a reception signal sensitivity of the pair of reception signal lines;
   a mode controller configured to perform the scanning in the setting of the second mode to select the first mode or the second mode; and
   a detection calculator configured to generate information indicating a touched position during the scanning performed in the setting state of the mode selected by the mode controller,
   wherein, in selecting the first mode or the second mode, the mode controller is further configured to:
   determine whether or not a touch corresponds to the first mode based on a comparison between a touch signal strength detected during the scanning in the setting of the second mode and a first threshold value;
   determine whether the touch corresponds to the second mode or there is no touch based on a comparison between the touch signal strength with a second threshold value corresponding to a lower signal strength than the first threshold value, and
   when it is determined that the touch corresponds to the first mode or the touch corresponds to the second mode, select the mode.

3. A touch panel device comprising:
   a touch panel; and
   a touch panel driving device configured to perform scanning of sequentially selecting a pair of adjacent transmission signal lines and a pair of adjacent reception signal lines on a touch panel,
   wherein the touch panel driving device includes:
   a reception circuit configured to select between a first mode and a second mode having higher sensitivity than the first mode as a reception signal sensitivity of the pair of reception signal lines;
   a mode controller configured to performs the scanning in the setting of the second mode to select the first mode or the second mode; and
   a detection calculator configured to generate information indicating a touched position during the scanning performed in the setting state of the mode selected by the mode controller,
   wherein, in selecting the first mode or the second mode, the mode controller is further configured to:
   determine whether or not a touch corresponds to the first mode based on a comparison between a touch signal strength detected during the scanning in the setting of the second mode and a first threshold value;
   determine whether the touch corresponds to the second mode or there is no touch based on a comparison between the touch signal strength with a second threshold value corresponding to a lower signal strength than the first threshold value, and
   when it is determined that the touch corresponds to the first mode or the touch corresponds to the second mode, select the mode.

* * * * *